UNITED STATES PATENT OFFICE.

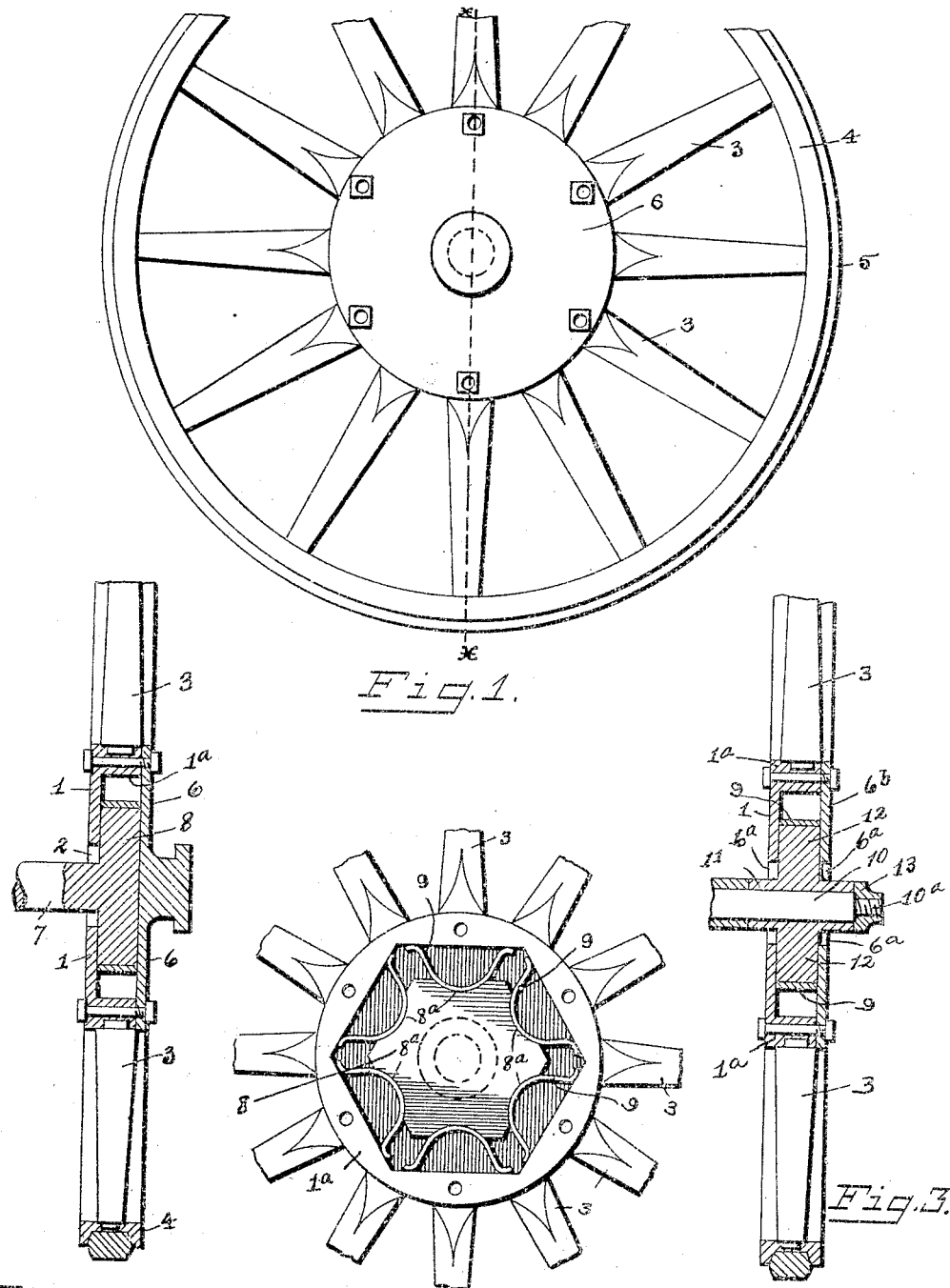

GUSTAVE A. SPAETH, OF COLUMBUS, OHIO.

RESILIENT WHEEL.

959,176.   Specification of Letters Patent.   Patented May 24, 1910.

Application filed November 18, 1908. Serial No. 463,168.

*To all whom it may concern:*

Be it known that I, GUSTAVE A. SPAETH, a citizen of the United States, residing at Columbus, in the county of Franklin and State of Ohio, have invented certain new and useful Improvements in Resilient Wheels, of which the following is a specification.

My invention relates to the improvement of resilient wheels of that class which are adapted for use as ground wheels on vehicles of various kinds and particularly adapted for use in connection with automobiles.

The objects of my invention are to provide an improved construction of resilient wheel of this class by means of which the jar, jolt or vibration incident to the running of the wheels over rough surfaces, is taken up by the wheels without being transmitted to the vehicle body, thereby obviating the necessity of using inflated tires on the rims of the wheels. These objects I accomplish in the manner illustrated in the accompanying drawing, in which: Figure 1 is an outer side elevation of a portion of an automobile rear wheel, Fig. 2 is a central vertical section on line $x$—$x$ of Fig. 1, Fig. 3 is a similar sectional view showing the slightly modified construction employed in the front wheels of the automobile, and Fig. 4 is a view in elevation of the hub portion of a wheel, with the outer plate removed.

Similar numerals refer to similar parts throughout the several views.

In carrying out my invention, I employ a hub member 1 which comprises a disk having an outwardly projecting marginal flange $1^a$, said disk or plate having a central opening 2. With the periphery of the hub member 1 or with its flange $1^a$, are suitably connected the inner ends of radially arranged spokes 3, these spokes having their outer ends connected with a suitable form of rim or felly 4, which may be encircled by a desirable construction of tire 5. As indicated in the drawing, the inner surface of the flange $1^a$ of the hub member 1, is so shaped as to impart thereto, a hexagonal form of hub recess, this effect being produced by the formation of a plurality of straight surfaces which meet at obtuse angles.

6 represents a detachable hub plate which is adapted to cover said hexagonal recess by being bolted to the flange $1^a$ of the hub member 1.

7 represents the rear axle of the vehicle, each end of which has formed therewith a head or flanged enlargement 8, said head having its outer surface formed to produce a hexagonal outline, as shown. As indicated in the drawing, the outer end portions of the axle 7 pass loosely through the hub member openings 2, and the hexagonal heads 8 are housed within the members 1 and on the inner sides of the plates 6. Between each recessed surface $8^a$ of the head 8 and the corresponding surface of the inner face of the hub flange $1^a$, I provide a spring 9 each of said springs consisting, as shown, of a bowed spring strip.

In Fig. 3 of the drawing, I have shown my invention as applied to the front wheel of an automobile. In this figure, 10 represents a spindle of the front axle, which is provided with the usual terminal threaded screw $10^a$. Upon this spindle is mounted rotatably a sleeve 11 which has formed therewith an enlargement or head 12. The sleeve 11 passes loosely through the opening $6^a$ of the hub member 1 and extends through a similar opening $6^a$ in the outer plate member $6^b$, which as prescribed for the plate 6 is secured to the hub flange $1^a$. The enlargement of head 12 which is of hexagonal form and corresponds with the head 8 heretofore described, is embraced, as shown, between the walls of the plate $6^b$ and hub member 1, and between the inner bearing faces of the hub member, and between the bearing faces of the head 12 are interposed the springs 9 as prescribed for the rear wheel. Upon the outer threaded termination of the spindle is secured the usual or any well known form of retaining nut 13.

With the construction which I have described in connection with the rear wheel, it will be understood that the plurality of spring connections between the hub and the head members, will offer such resistance to weight of the vehicle body and to jolts or jars contributed to the wheels as to cushion the vehicle body against the result of shocks of the character mentioned. Although in the front wheel construction, the wheel rotates upon the axle spindle, it is obvious that the springs will likewise absorb the effect of jars or jolts.

Owing to the arrangement of the springs adjacent to each other and at obtuse angles with each other, it will readily be understood that at any point in the rotation of the wheel, a spring bearing will be effected, which bearing may be wholly upon one of said springs or distributed between two adjacent springs.

What I claim, is—

In a device of the character described, the combination with an axle having an angular enlargement, of a hub having an angular recess within which said enlargement lies, the inner wall of said recess being spaced from the outer wall of the axle enlargement and parallel therewith, and bowed springs disposed between the outer wall of the axle enlargement and the inner wall of the angular recess, there being a plurality of concavities formed in the face of the angular enlargement of the axle, said concavities receiving the bowed portions of the springs and both ends of said springs freely and slidably engaging the inner wall of the angular recess of the wheel hub.

In testimony whereof I affix my signature in presence of two witnesses.

GUSTAVE A. SPAETH.

Witnesses:
L. CARL STOUGHTON,
A. L. PHELPS.